(12) United States Patent
Imada et al.

(10) Patent No.: US 11,652,243 B2
(45) Date of Patent: May 16, 2023

(54) NON-DESTRUCTIVE INSPECTION METHOD

(71) Applicant: Konica Minolta, Inc., Tokyo (JP)

(72) Inventors: Masahiro Imada, Tokyo (JP); Takuji Hatano, Osaka (JP); Koujirou Sekine, Osaka (JP); Masaaki Tsuchida, Tokyo (JP); Tsukasa Yagi, Hyogo (JP)

(73) Assignees: KONICA MINOLTA, INC, Tokyo (JP); SPIN SENSING FACTORY CORP., Sendai (JP)

(*) Notice: Subject to any disclaimer, the term of this patent is extended or adjusted under 35 U.S.C. 154(b) by 448 days.

(21) Appl. No.: 16/643,298

(22) PCT Filed: Sep. 10, 2018

(86) PCT No.: PCT/JP2018/033347
§ 371 (c)(1),
(2) Date: Feb. 28, 2020

(87) PCT Pub. No.: WO2019/059012
PCT Pub. Date: Mar. 28, 2019

(65) Prior Publication Data
US 2021/0036384 A1 Feb. 4, 2021

(30) Foreign Application Priority Data
Sep. 19, 2017 (JP) ................. 2017-178498

(51) Int. Cl.
*H01M 10/42* (2006.01)
*G01N 23/041* (2018.01)
(Continued)

(52) U.S. Cl.
CPC .......... *H01M 10/4285* (2013.01); *G01N 3/40* (2013.01); *G01N 23/041* (2018.02);
(Continued)

(58) Field of Classification Search
CPC .......... H01M 10/4285; H01M 10/0525; G01N 23/041; G01N 3/40; G01N 25/72; G01N 27/83
(Continued)

(56) References Cited

U.S. PATENT DOCUMENTS 4,859,943 A * 8/1989 Evans .................... G01N 27/84
324/216

FOREIGN PATENT DOCUMENTS

CN 107076679 A 8/2017
CN 107153902 A 9/2017
(Continued)

OTHER PUBLICATIONS

Kastner et al.; "Comparison of phase contrast X-ray computed tomography methods for non-destructive testing of materials"; Pub. Date Apr. 16, 2012; Proceedings of the 19th World Conference on Nondestructive Testing (Year: 2012).*
(Continued)

*Primary Examiner* — Feba Pothen
*Assistant Examiner* — Rahul Maini
(74) *Attorney, Agent, or Firm* — BakerHostetler

(57) ABSTRACT

A non-destructive inspection method of inspecting an inspection target using multiple different types of non-destructive inspection means that include one non-destructive inspection means and at least one other non-destructive inspection means. The method includes determining a marking position on the inspection target in a detection result by the one non-destructive inspection means, causing a device to store the marking position, and fixedly forming a mark on the inspection target corresponding to the marking position. The mark is detectable by the other non-destructive inspection means. The method further includes causing the other non-destructive inspection means to inspect an inspection
(Continued)

target including the mark. The method further includes contrasting detection results by the multiple different types of non-destructive inspection means in reference to the mark which is the marking position.

5 Claims, 1 Drawing Sheet

(51) Int. Cl.
    *G01N 3/40*     (2006.01)
    *G01N 25/72*     (2006.01)
    *G01N 27/83*     (2006.01)
    *H01M 10/0525*     (2010.01)

(52) U.S. Cl.
    CPC ............ *G01N 25/72* (2013.01); *G01N 27/83* (2013.01); *H01M 10/0525* (2013.01)

(58) Field of Classification Search
    USPC ....................................................... 324/226
    See application file for complete search history.

(56) References Cited

FOREIGN PATENT DOCUMENTS

| | | | | |
|---|---|---|---|---|
| DE | 102012215120 A1 * | 2/2014 | ........... | G01N 27/403 |
| DE | 102012215120 A1 | 2/2014 | | |
| JP | H09-281057 A | 10/1997 | | |
| JP | H10-010059 A | 1/1998 | | |
| JP | 2915025 B2 | 7/1999 | | |
| JP | 2002-310954 A | 10/2002 | | |
| JP | 2004184299 A * | 7/2004 | ........... | G01N 21/892 |
| JP | 2005-003542 A | 1/2005 | | |
| JP | 2005003542 A * | 1/2005 | ............. | G01N 27/84 |
| JP | 2007-315834 A | 12/2007 | | |
| JP | 2008-235054 A | 10/2008 | | |
| JP | 2012-053049 A | 3/2012 | | |
| JP | 2016-017823 A | 2/2016 | | |
| JP | 2017-104202 A | 6/2017 | | |

OTHER PUBLICATIONS

International Patent Application No. PCT/JP2018/033347; Int'l Preliminary Report on Patentability; dated Mar. 24, 2020; 10 pages.
International Search Report and Written Opinion issued in PCT/JP2018/033347, dated Nov. 27, 2018.
Japan Patent Application No. 2019-543554; Notice of Reasons for Refusal; dated Apr. 19, 2022; 7 pages.
China Patent Application No. 201880060655.4; Office Action; dated Mar. 14, 2022; 18 pages.
China Patent Application No. 201880060655.4; Second Office Action; dated Dec. 5, 2022; 22 pages.

* cited by examiner

NON-DESTRUCTIVE INSPECTION METHOD

The present U.S. Patent Application is U.S. National Phase Application under 35 U.S.C. 371 of International Application PCT/JP2018/033347 filed on Sep. 9, 2018, which claims a priority under the Paris Convention to Japanese Patent Application No. 2017-178498 filed on Sep. 19, 2017, the entire disclosures of which are incorporated herein by reference in their entireties.

TECHNICAL FIELD

The present invention relates to a non-destructive inspection method.

BACKGROUND ART

In some cases, it is desired to inspect an inspection target using multiple different types of non-destructive inspection means, for example, to inspect a lithium ion battery (hereinafter referred to as "LIB") using an X-ray imaging device (such as an X-ray Talbot imaging device) and a magnetic field distribution measuring device. By X-ray imaging, it is possible to see structural defects, presence or absence of a foreign object, location of the foreign object, and the like inside the LIB. By magnetic field distribution measurement that can visualize a current distribution inside the LIB, it is possible to see magnitude and a position of the leakage current.

In an actual inspection, it is necessary to make a multi-faceted judgment using the detection results not alone but in combination. For example, even when a foreign object is found in X-ray imaging, there may be no problem as long as it does not cause a leakage. Alternatively, when there is a leakage, it may be possible to understand the cause of the leakage by X-ray imaging of the leakage portion so as to make a multifaceted judgment using both detection results in combination.

In making a multifaceted judgment based on the detection results using multiple different types of non-destructive inspection means, independently obtained detection results cannot be compared as they are, depending on the placement of the inspection target such as a side (front side or back side) or a direction of the sample during detection, the difference in coordinates (XY scale, orthogonality, etc.) between devices, and the like. A mark simply added with a marker may not be captured or reflected in the detection results. Therefore, in examination of one detection result in comparison with the other considering positional relationships as well, it is necessary to calibrate coordinates in advance such that positional relationships with the respective devices are equivalent, or to calibrate coordinates and/or positional relationships using a mark formed on the inspection target and captured with a camera in each inspection. In this case, because calibration is necessary, there is a problem that the device becomes large due to addition of a camera and the like.

Furthermore, in a laminated and packaged target such as an LIB, there is a problem that a positional relationship may change between a mark on the outside of the package and an internal part such as an electrode.

According to the invention described in Patent Document 1, one inspection device specifies a position of an inspection target prior to an inspection, on the basis of the feature of an outer shape of a semiconductor substrate to be inspected, such as two sides perpendicular to each other or an orientation flat among outer lines of an element forming area. The other inspection device specifies the position of the inspection target prior to the inspection, on the basis of a mark for alignment (not shown in the drawings).

CITATION LIST

Patent Literature

[Patent Document 1] JP 2915025 B2
[Patent Document 2] JP 2017-104202 A

SUMMARY OF INVENTION

Technical Problem

According to the invention described in Patent Document 1, detection results of a semiconductor substrate are obtained using multiple different types of non-destructive inspection means, so that positions on an inspection target specified in the respective detection results can be matched with each other.

However, outer shape of a laminated and packaged inspection target such as the LIB is unstable and may change during successive inspections. According to the invention described in Patent Document 1, in order that the inspections are each preceded by an optical search such as talking an image with a camera. Thus, because position specification is necessary before each inspection, there is a problem that the device becomes large due to addition of a camera, for example.

The present invention has been made in view of the above problems in the above conventional techniques. The object of the present invention is, in inspections of an inspection target using multiple different types of non-destructive inspection means, to make positions on the inspection target specified in the detection results by the respective non-destructive inspection means to be matched with each other easily and accurately.

Solution to Problem

In order to solve the above problems, the invention according to claim 1 provides a non-destructive inspection method of inspecting an inspection target using multiple different types of non-destructive inspection means that include one non-destructive inspection means and at least one other non-destructive inspection means, the method including:

determining a marking position on the inspection target in a detection result by the one non-destructive inspection means, causing a device to store the marking position, and fixedly forming a mark on the inspection target corresponding to the marking position, the mark being detectable by the other non-destructive inspection means, causing the other non-destructive inspection means to inspect an inspection target including the mark, and in reference to the mark which is the marking position, contrasting detection results by the non-destructive inspection means.

The invention according to claim 2 provides the non-destructive inspection method according to claim 1, further comprising, after specifying a peculiar portion in reference to the marking position and based on the detection result by the one non-destructive inspection means, causing the other non-destructive inspection means to intensively inspect the peculiar portion.

nThe invention according to claim 3 provides the non-destructive inspection method according to claim 1 or 2, further comprising, after allocating information that is not related to position reference for the mark and after fixedly forming the mark that holds the information on the inspection target, reading the information from a detection result by the other non-destructive inspection means.

The invention according to claim 4 provides the non-destructive inspection method according to any one of claims 1 to 3, wherein the non-destructive inspection means include two or more of an X-ray imaging means, a magnetic field distribution measurement means, a thermography imaging means, and a hardness measurement means.

The invention according to claim 4 provides the non-destructive inspection method according to claim 1, wherein the nondestructive inspection means include an X-ray Talbot imaging device as the X-ray imaging means.

The invention according to claim 5 provides the non-destructive inspection method according to any one of claims 1 to 4, wherein the other non-destructive inspection means includes the magnetic field distribution measurement means, and the mark is formed of a material including a magnetic material.

Advantageous Effects of Invention

According to the present invention, in inspections of an inspection target using multiple different types of non-destructive inspection means, positions on the inspection target specified in the detection results by the respective non-destructive inspection means can be matched with each other easily and accurately. As a result, multifaceted judgment can be made based on the detection results by the multiple different types of non-destructive inspection means.

DESCRIPTION OF EMBODIMENTS

Hereinafter, embodiments of the present invention will be described with reference to the drawings. The following is an embodiment of the present invention and does not limit the present invention.

An inspection target is inspected using multiple non-destructive inspection means of different types. The multiple different types of non-destructive inspection means include any two or more of an X-ray imaging means, a magnetic field distribution measurement means, a thermography imaging means, and a hardness measurement means. In the example mainly described in the present embodiment are used an X-ray imaging device including an X-ray imaging means and a magnetic field distribution measurement device including a magnetic field distribution measurement means.

The X-ray imaging device and the magnetic field distribution measurement device are separate from each other, and the inspection target moves between and inspected by them. Therefore, the placement of the inspection target with respect to an origin position differs between devices.

An inspection A, marking, and other inspections B, C, are performed in this order.

Figure 1A:
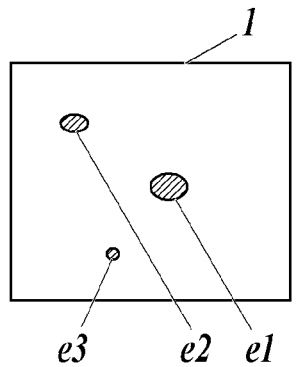
FIG. 1A is a schematic diagram of an inspection target (or a detection result) in a step of an inspection A in a non-destructive inspection method according to an embodiment of the present invention.

First, the inspection A is performed (FIG. 1A). For example, in the inspection A, peculiar portions e1, e2, and e3 are detected in an inspection target 1 (for example, in an LIB mentioned above) as shown in FIG. 1A. The peculiar portions may be an abnormal portion, a portion suspected of an abnormal portion, a portion in need of a further inspection, or the like.

Figure 1B:
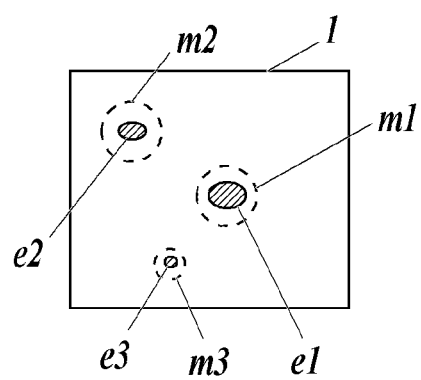
FIG. 1B is a schematic diagram of an inspection target (or a detection result) in a step of forming a mark in a non-destructive inspection method according to an embodiment of the present invention.

Next, marking positions are determined in the detection result (FIG. 1A) in the inspection A and stored in the device. At the same time, corresponding to the respective marking positions, marks m1, m2, and m3 that are detectable in the inspections B, C are formed fixedly (FIG. 1B).

For example, the inspection A includes detection using an X-ray imaging device and the inspection B includes detection using a magnetic field distribution measuring device. Here, a magnetic material is used as the material constituting the marks. For example, an ink including a magnetic material is used to print the marks.

The X-ray imaging device may be an X-ray Talbot imaging device (see Patent Document 2). When an X-ray Talbot imaging device is used, an X-ray inspection result with a higher contrast than usual can be obtained.

The magnetic sensor mounted on the magnetic field distribution measuring device may be an MR sensor, an MI sensor, a TMR sensor (a tunnel type magnetoresistive sensor), or the like. A TMR sensor (tunnel type magnetoresistive sensor) having high sensitivity is preferably used.

The inspections are performed with separate devices, and a printing device (for example, an inkjet printer) are attached or linked to each of the devices. The printing device is used for forming the marks fixedly each at a position of coordinates determined on the inspection target in the detection result in the inspection.

Figure 1C:
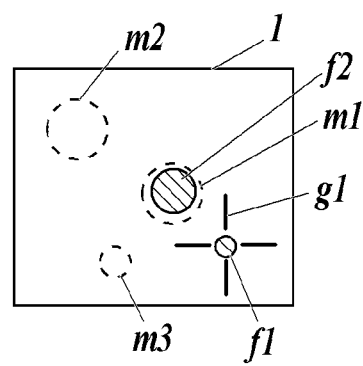
FIG. 1C is a schematic diagram of an inspection target (or a detection result) in a step of other inspection in a non-destructive inspection method according to an embodiment of the present invention.

Next, in the inspection B, the detection result of the inspection target 1 including the marks m1, m2, and m3 is detected as shown in FIG. 1C, for example. Peculiar portions f1 and f2 are detected in the inspection target 1 as shown in FIG. 1C.

Next, the detection results in the inspections A and B are overlapped, compared, and examined in a correct positional relationship in reference to the positions of the marks m1, m2, and m3. That is, in reference to the positions of the marks m1, m2, and m3 stored in the inspection A and in reference to the marks m1, m2, and m3 detected in the inspection B, the same positions in the detection results in the inspections A and B are contrasted. For example, coordinates (x1, y1) are determined on a plane having X- and Y-coordinate axes and defined in reference to the marks m1, m2, and m3. Abnormality is determined by contrasting, comparing, and examining a detected value(s) at the coordinates (x1, y1) in a detection result in the inspection A and the detected value at the coordinates (x1, y1) in a detection result in the inspection B. For example, because the peculiar portion e1 and peculiar portion 12 respectively in FIGS. 1A and 1C are at the same coordinates, the portions are determined to be an abnormal portion.

The detection results in the inspections A and B may be further used for detailed analysis of a failure in the inspection C (for example, cross-sectional TEM). Here; a portion to be analyzed can be selected in reference to the marks m1, m2, and m3.

The detection result in the inspection B with a new mark g1 added thereto may be used in and after the following inspection C. That is, in and after the inspection C, a portion to be analyzed can be selected in reference to the marks m1, m2, m3 and the mark g1.

Thereafter, further inspection(s) D . . . can be performed in the same manner, and the number of marks can be increased as the number of inspections increases. The marks m1, m2, and m3 for positioning are determined after the detection result in the inspection A is obtained, and are formed on the inspection target 1 before the detection in the inspection B.

As a result, failure cause analysis and shipping inspection can be efficiently performed through accurate understanding and comparison of the same position of the inspection target in the multiple different types of inspections.

The marks m1, m2, and m3 may include information not related to position reference. For example, the marks m1, m2, and m3 may be one-dimensional or two-dimensional barcodes each representing an individual identification number(s). Prior to the inspection A, the information is allocated to the marks m1, m2, and m3 and shared by the device performing the inspection A and the printing device attached or linked thereto. The printing device fixedly forms the marks m1, m2, and m3 including the information on the inspection target 1. Thereafter, each inspection device reads the information from the marks (code recording media) included in the detection result in and after the inspection B. This is realized by forming the marks so as to be commonly read by all the non-destructive inspection means in and after the inspection B. As a result, because the individual identification number(s) is present together with the inspection target in the detection results, it is easy and reliable to check the detection results of the same individual.

The non-destructive inspection means is not limited to the X-ray imaging means or the magnetic field distribution measurement means, as long as it can measure an in-plane distribution non-destructively and obtain a detection image as a result. For example, it may be a thermographic imaging means that measures a heat distribution by thermography, a hardness measuring means that inspects hardness at each coordinate point with a stylus, or the like. In thermography, the mark may be formed with an ink material having emissivity which is different from the surface of the inspection target. When a stylus is used, the mark may be formed with an ink material having hardness which is different from the inspection target. A combination of them may be used as an ink. For example, the mark may be formed with an ink including two or more or all of materials each having magnetism, emissivity different from the surface of the inspection target, and hardness different from the inspection target.

In the inspection method, a peculiar portion(s) may be detected in the prior inspection A, and the peculiar portion found in the inspection A may be finely and intensively inspected in the following inspection B. That is, in this method, the peculiar portion is specified based on a detection result using one of the multiple non-destructive inspection means, and then intensively inspected using another non-destructive inspection means. "Intensive inspection of the peculiar portion" means that only the peculiar portion is the target to be inspected or that the peculiar portion is inspected with a higher resolution than the other portions.

For example, peculiar portions e1, e2, and e3 are specified based on the result of inspecting the entire surface of the inspection target using an X-ray imaging device in the inspection A, and then finely measured using a magnetic field distribution measuring device in the inspection B. While an entire surface can be captured at a time and inspected in a short time in the X-ray imaging, inspection of a large area may take a lot of time in the magnetic field distribution measurement, for example, when a measurement head performs measurement during a scan. In such a case, the inspection time can be shortened when the magnetic field distribution measuring device finely examines only the peculiar portion(s) detected in the X-ray imaging.

As described above, according to the non-destructive inspection method of the present embodiment, when an inspection target is inspected using multiple different types of non-destructive inspection means, positions specified in a detection result of the inspection target using each of the non-destructive inspection means can be matched with each other easily and accurately. As a result, multifaceted judgment can be made based on detection results by the multiple different types of non-destructive inspection means.

In spite of the above embodiments, the number of the other inspection(s) after the prior inspection A before marking may be one. Furthermore, when two or more other inspections are performed, that is, when there are two or more other non-destructive inspection means, the inspections can be performed at the same time without any particular problems in carrying out the present invention.

In the above embodiment, the marks m1, m2, and m3 and the mark g1 have shapes (a circle, an aiming symbol, or the like) each indicating a peculiar portion detected in the corresponding inspection, and the peculiar portions are determined based on their shapes (for example, a peculiar portion is determined to be in a circle) according to a rule consistently used in the inspections. Otherwise, regardless of the presence or position of the peculiar portion according to the inspection A, the marks m1, m2, and m3 required for position determination may be at a predetermined position, for example, at an edge of the inspection target 1, such that the coordinate information of a peculiar portion with reference to the marks m1, m2, and m3 is consistently used in the inspections. In this way, when a peculiar portion cannot be detected in the inspection A, the marking positions of the marks m1, m2, and m3 is not limited, but may be determined in advance (for example, determined to be an edge). The marking positions of the marks m1, m2, and m3 may be determined in advance (for example, determined to be an edge) only in a case where no peculiar portion is found in the inspection A or in all cases.

INDUSTRIAL APPLICABILITY

The present invention can be applied to a non-destructive inspection method of a lithium ion battery and the like.

REFERENCE SIGNS LIST

1 INSPECTION TARGET
e1, e2, e3 PECULIAR PORTION
f1, f2 PECULIAR PORTION
m1, m2, m3 MARK

The invention claimed is:
1. A non-destructive inspection method of inspecting an inspection target using multiple different types of non-destructive inspection means that include one non-destruc- tive inspection means and at least one other non-destructive inspection means, the method comprising:
  determining a marking position on the inspection target in a detection result by the one non-destructive inspection means, causing a device to store the marking position, and fixedly forming a mark on the inspection target corresponding to the marking position, the mark being detectable by the at least one other non-destructive inspection means,
  causing the at least one other non-destructive inspection means to inspect the inspection target including the mark, and,
  contrasting detection results comprising the detection result by the multiple different types of non-destructive inspection means in reference to the mark which is in the marking position, wherein
  the multiple different types of non-destructive inspection means include two or more of an X-ray imaging means, a magnetic field distribution measurement means, a thermography imaging means, and a hardness measurement means.

2. The non-destructive inspection method according to claim 1, further comprising, after specifying a peculiar portion in reference to the marking position and based on the detection result by the one non-destructive inspection means, causing the at least one other non-destructive inspection means to intensively inspect the peculiar portion.

3. The non-destructive inspection method according to claim 1, further comprising, after allocating information that is not related to position reference for the mark and after fixedly forming the mark that holds the information on the inspection target, reading the information from a detection result by the at least one other non-destructive inspection means.

4. The non-destructive inspection method according to claim 1, wherein the multiple different types of non-destructive inspection means include an X-ray Talbot imaging device as the X-ray imaging means.

5. The non-destructive inspection method according to claim 1, wherein
  the at least one other non-destructive inspection means includes a magnetic field distribution measurement means, and
  the mark is formed of a material including a magnetic material.

* * * * *